UNITED STATES PATENT OFFICE 2,686,169

POLYMERIC VINYL CHLORIDE FIBER-FORMING COMPOSITIONS

George E. Ham, Dayton, Ohio, assignor to The Chemstrand Corporation, Decatur, Ala., a corporation of Delaware No Drawing. Application May 5, 1952, Serial No. 286,210

9 Claims. (Cl. 260—45.5)

This invention relates to new fiber-forming compositions. More particularly the invention is concerned with the production of new polyvinyl chloride compositions and articles produced therefrom which have superior properties such as improved stability to heat, etc., as hereinafter described.

It is well-known to prepare polymeric materials from vinyl chloride and these materials are finding greatly expanding usefulness. Fibers and other shaped articles of polyvinyl chloride have been marketable because of the relatively low cost of vinyl chloride. However, polyvinyl chloride possesses several draw-backs which have discouraged the use of shaped articles of polyvinyl chloride in many fields of application. For example, polyvinyl chloride softens and shrinks excessively at elevated temperatures and when articles produced from polyvinyl chloride are used for some time in the presence of heat they begin to stiffen and become brittle. Hence the problem is presented to provide a means for preparing high quality products of polyvinyl chloride having improved heat stability, particularly with respect to shrinkage.

Accordingly, it is an object of the present invention to provide new vinyl chloride compositions which are not objectionable with respect to thermal stability. A further object of the invention is to provide an improved low cost fiber-forming composition. Other objects and advantages of the present invention will be apparent from the description thereof hereinafter.

While the present invention is described as it is primarily applicable to the manufacture of fibers and filaments, it is to be understood that this is merely intended in an illustrative sense and the invention is not to be limited thereby, since the same is also applicable to the manufacture of other shaped articles of polyvinyl chloride, such as films, foils, rods, threads, molded articles, and the like, etc.

It has been found, and the objects of the invention are in general accomplished by blending polyvinyl chloride with from two to 35% of a copolymer containing at least 90% by weight in the polymer molecule of acrylonitrile, and preferably in excess of 95%. In the compositions of the present invention, the polyvinyl chloride is present in an amount within the range of 65 to 98% by weight. Such blended compositions have been found to be substantially improved with respect to their softening characteristics and are thus more stable to high temperatures than polyvinyl chloride alone. While the present invention is primarily concerned with improving the thermal stability of polyvinyl chloride, it is also applicable to improving the thermal stability of various copolymers of vinyl chloride, such as those containing up to 15% by weight of vinyl acetate, vinylidene chloride, acrylonitrile, methacrylonitrile, and methyl acrylate.

Among the copolymers suitable in the practice of the present invention are those containing at least 90% of acrylonitrile and up to 10% of other polymerizable mono-olefinic monomers copolymerizable therewith. Suitable mono-olefinic monomers include vinyl acetate, styrene, vinyl chloride, vinylidene chloride, alpha-methylstyrene, alkyl acrylates, alkyl methacrylates, alkyl fumarates, alkyl maleates, wherein the alkyl groups have up to four carbon atoms, methacrylonitrile, the vinylpyridines, the alkyl substituted vinylpyridines, and the vinyl, allyl, isopropenyl and methallyl substituted N-heterocyclic compounds. The copolymers may have copolymerized therein minor proportions of other monomers for the purpose of developing specialized properties, such as dye-receptivity. Comonomers imparting the dye-receptivity property may be vinylpyridine or other N-heterocyclic monomers. Fire-proof properties are developed when minor proportions of vinylidene chloride are copolymerized therewith. Vinyl chloroacetate may be used as a third monomer and thereby the copolymer is made reactive with ammonia and amines and the resulting chemically treated polymer becomes dye-receptive.

The acrylonitrile copolymers and the polyvinyl chloride may be blended by a variety of procedures. The finely divided polymers may be mechanically mixed and thereafter fabricated into fibers by conventional methods, for example, the dissolution in suitable solvents and extrusion of the prepared solution through a die or spinneret containing a plurality of apertures. Following the preparation of the fiber by extrusion into a gaseous medium or a liquid medium adapted to remove the solvent from the continuous polymeric composition, the resulting fiber is then stretched, shrunk or otherwise subjected to physical working or heat-treatment to develop the optimum fiber properties. The methods of fabricating and processing the fibers are not regarded as part of this invention, except to the extent that a wider variation in types of processing is possible.

A preferred method of preparing a blended composition involves the dispersing of the polymeric components into a suitable solvent for both components. Suitable solvents are N,N-dimethylacetamide, N,N-dimethylformamide, gamma-butyrolactone, nitromethane, dimethyl phosphite, and ethylene carbonate. Solutions in these solvents are spun into fibers by conventional methods.

Further details of the invention are set forth with respect to the following examples.

Example I

An 18% solids solution in dimethylacetamide of a blend of 80% by weight of polyvinyl chloride and 20% of a copolymer of 97% acrylonitrile and 3% vinyl acetate, was prepared. The resultant solution, which was slightly cloudy, was spun through a spinneret (30 apertures, each 0.005 inch in diameter) into a mixture of 60% dimethylacetamide and 40% water. The fibers so produced were washed continuously with hot water. The fiber was dried on a steam heated drum and stretched in a steam tube 119%.

The shrinkage of the fiber was then determined at various temperatures employing a Fisher-Johns melting point block modified with a grid scale. The following shrinkage data were obtained:

| Temperature: | Percent shrinkage |
|---|---|
| 85° C. | 5 |
| 110° C. | 10 |
| 125° C. | 15 |
| 140° C. | 20 |
| 220° C. | 27.5 |

A zero strength temperature of 142° C. was obtained. The zero strength temperature was determined by contacting the fiber under slight tension with a heated rod of known temperatures.

A second solution containing 18% of polyvinyl chloride in dimethylacetamide was prepared and the resultant solution spun into fibers as outlined above. The fibers were then stretched 138% as described above and the following shrinkage data on the fibers thus obtained:

| Temperature: | Percent shrinkage |
|---|---|
| 55° C. | 2.5 |
| 105° C. | 50 |
| 220° C. | 78 |

The zero strength temperatures for the polyvinyl chloride fiber without the acrylonitrile copolymer was 133° C.

It can be seen from the above data that the blending of a copolymer of acrylonitrile with the polyvinyl chloride increases the stability of the latter to heat. In addition, the percent shrinkage of the polyvinyl chloride is greatly reduced at elevated temperatures.

Example II

An 18% solids solution in dimethylacetamide of a blend of 80% by weight of polyvinyl chloride and 20% of a copolymer of 95% acrylonitrile and 5% styrene was prepared. The resultant solution was spun and the fibers stretched as described in Example I. Shrinkage and zero strength temperature data on the fibers indicated a substantial improvement in thermal characteristics over polyvinyl chloride fibers.

Example III

A 19% solids solution in dimethylacetamide of a blend of 80% by weight of polyvinyl chloride and 20% of a copolymer of 95% acrylonitrile and 5% vinylidene chloride was prepared. The resultant solution was spun and the fibers stretched as described in Example I. The shrinkage and zero strength temperature data on the fibers were quite similar to those reported in Example I for the blended composition.

Fibers, films, and other shaped articles, produced from the compositions in accordance with the present invention, find wide use in the manufacture of such materials as seat covers, table covers, shower curtains, and the like, and many other articles where stability to heat is important. Many other advantages of the instant invention will be apparent to those skilled in the art.

It is to be understood that changes and variations may be made without departing from the spirit and scope of the invention as defined in the appended claims.

I claim:

1. A fiber-forming composition which comprises a blend of from 65 to 98% by weight of polyvinyl chloride and from two to 35% by weight of a copolymer comprising at least 90% by weight of acrylonitrile and not more than 10% of a polymerizable mono-olefinic monomer copolymerizable therewith.

2. A fiber-forming composition as defined in claim 1 wherein the mono-olefinic monomer is vinyl acetate.

3. A fiber-forming composition as defined in claim 1 wherein the mono-olefinic monomer is styrene.

4. A fiber-forming composition as defined in claim 1 wherein the mono-olefinic monomer is vinylpyridine.

5. A fiber-forming composition as defined in claim 1 wherein the mono-olefinic monomer is vinylidene chloride.

6. A fiber-forming composition as defined in claim 1 wherein the mono-olefinic monomer is methyl methacrylate.

7. A fiber-forming composition which comprises a blend of from 65 to 98% by weight of polyvinyl chloride and from two to 35% by weight of a copolymer containing by weight in the polymer molecule, 97% of acrylonitrile and 3% of vinyl acetate.

8. A fiber-forming composition which comprises a blend of 80% by weight of polyvinyl chloride and 20% by weight of a copolymer containing by weight in the polymer molecule 97% of acrylonitrile and 3% of vinyl acetate.

9. A fiber-forming composition which comprises a blend of from 65 to 98% by weight of a polymer containing at least 85% by weight of vinyl chloride and not more than 15% of another polymerizable mono-olefinic monomer and from two to 35% by weight of a copolymer comprising at least 90% by weight of acrylonitrile and not more than 10% of a polymerizable mono-olefinic monomer copolymerizable therewith.

References Cited in the file of this patent

UNITED STATES PATENTS

| Number | Name | Date |
|---|---|---|
| 2,404,714 | Latham | July 23, 1946 |
| 2,646,417 | Jennings | July 21, 1953 |